Figure 1:
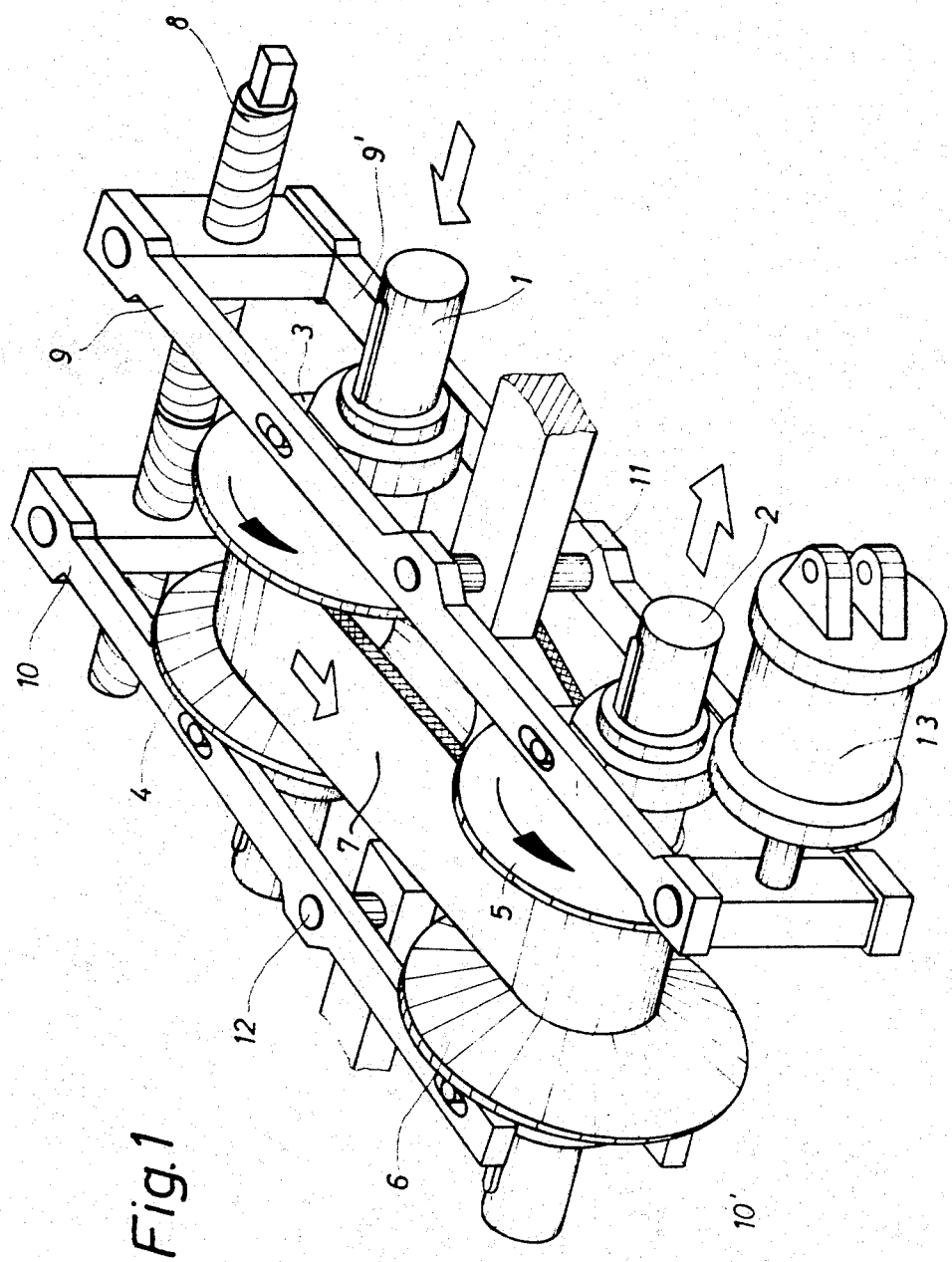

United States Patent [19]
Kaiser et al.

[11] 3,731,549
[45] May 8, 1973

[54] INFINITELY VARIABLE TRANSMISSION

[75] Inventors: Wilhelm Kaiser, Angermund; Wolfgang Meurer, Buderich; Georg Muller, Dusseldorf, all of Germany

[73] Assignee: Jagenberg-Werke AG, Dusseldorf, Germany

[22] Filed: June 7, 1971

[21] Appl. No.: 150,328

[30] Foreign Application Priority Data

June 19, 1970 Germany.....................P 20 30 184.2
Dec. 17, 1970 Germany.....................P 20 62 170.9

[52] U.S. Cl..................74/230.17 A, 74/230.17 F
[51] Int. Cl................................................F16h 9/00
[58] Field of Search...............74/230.17 A, 230.17 F

[56] References Cited

UNITED STATES PATENTS

| | | | |
|---|---|---|---|
| 3,138,033 | 6/1964 | Glasson et al. | 74/230.17 A |
| 3,097,540 | 7/1963 | Berens | 74/230.17 A |
| 3,216,268 | 11/1965 | Moser et al. | 74/230.17 A |
| 3,333,480 | 8/1967 | Landman et al. | 74/230.17 A |

*Primary Examiner*—C. J. Husar
*Attorney*—Burgess, Dinklage and Sprung

[57] ABSTRACT

In an infinitely variable speed transmission comprising a pair of transmission shafts one of which drives and the other of which is driven, two pairs of conical disks respectively carried on said pair of shafts, a transmission chain operatively connecting said pair of disks, and means for adjusting the spacing between the disks of each pair and thereby infinitely vary the transmission ratio, there is provided a piston-cylinder which applies a counter-force either against the transmission chain or the means for adjusting the spacing between a pair of disks. The counter-force is controlled by the load on the driven transmission shaft and is especially intended to ensure constant transmission ratio as is needed in cutting machines wherein the length of material between cuts must be identical.

7 Claims, 7 Drawing Figures

WILHLEM KAISER, WOLFGANG MEURER, GEORG MÜLLER    INVENTORs

BY:

BURGESS, DINKLAGE & SPRUNG

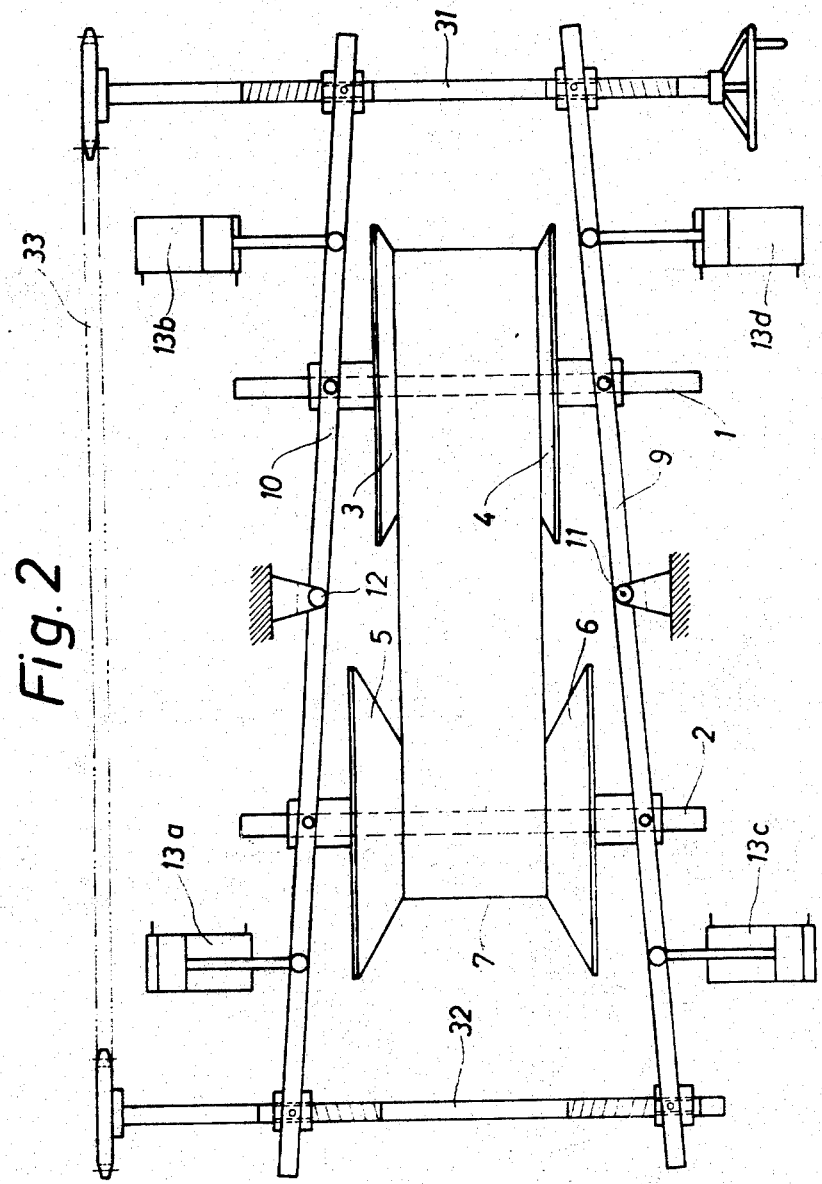

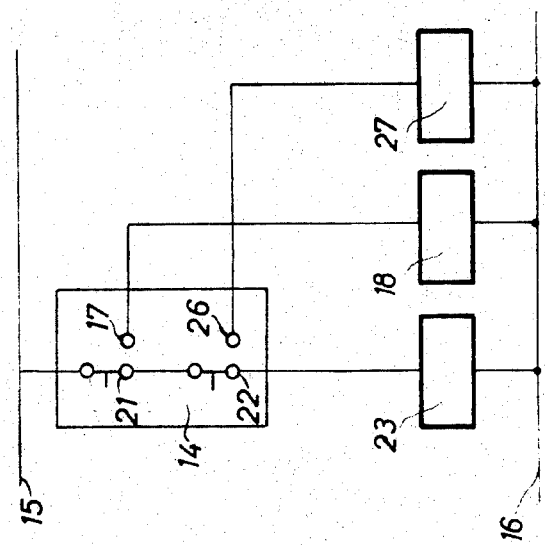
Fig. 4
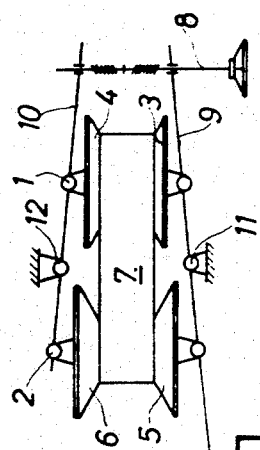
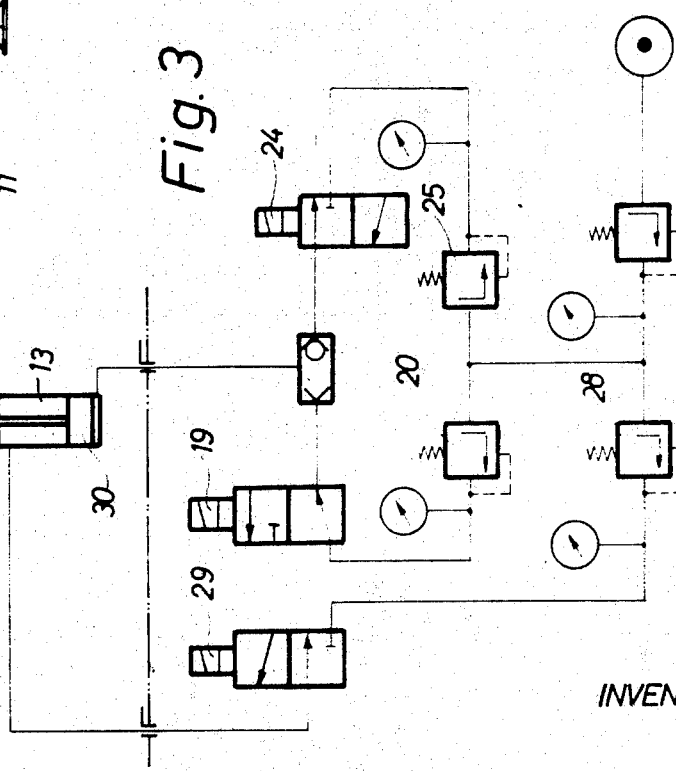
Fig. 3
INVENTORS
Wilhelm Kaiser, Wolfgang Meuser
+ Georg Müller
By:
Burns, Dickey + Spring

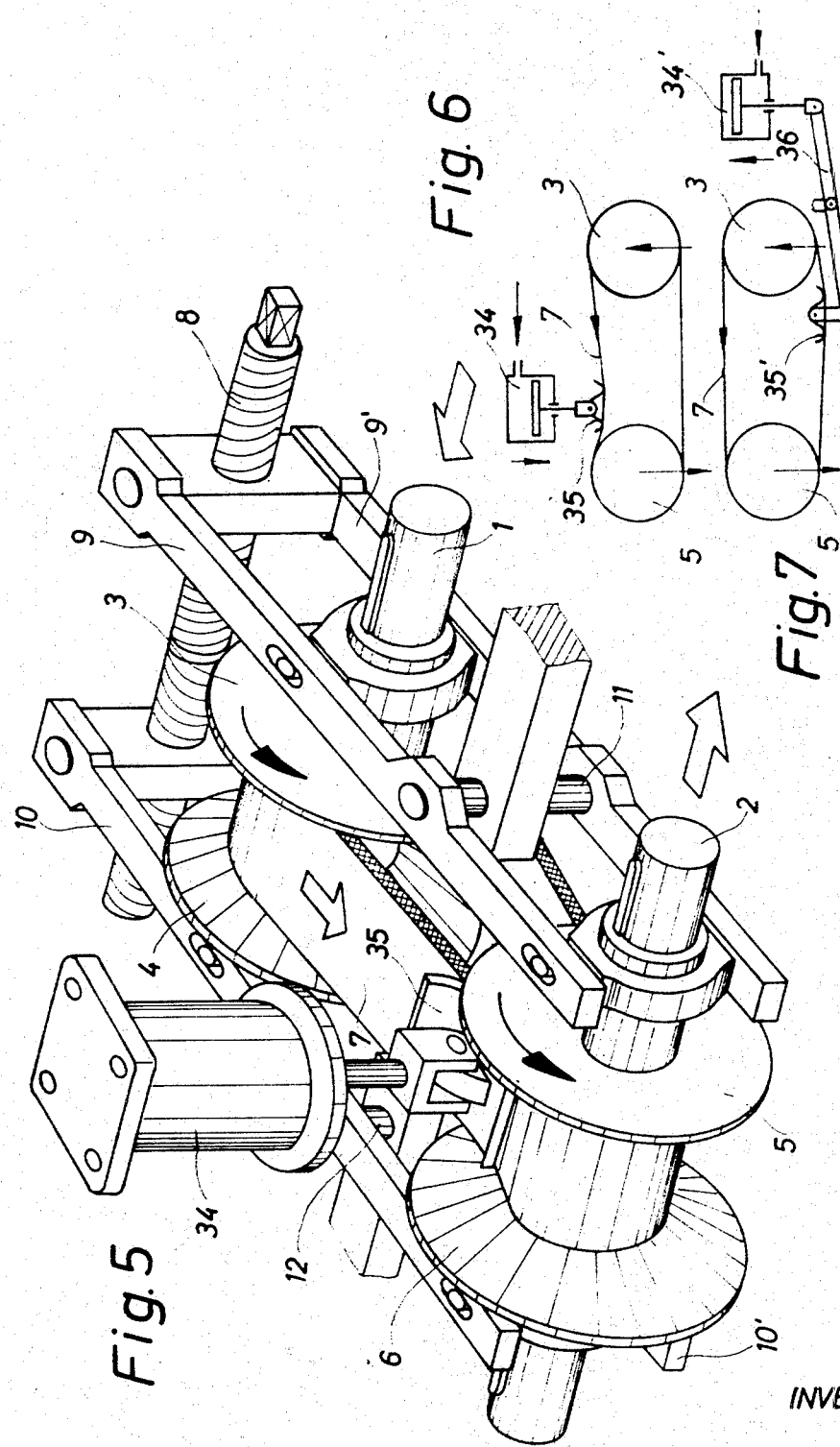

INFINITELY VARIABLE TRANSMISSION

The invention relates to an infinitely variable speed transmission, especially for cutting machine drives, consisting of two pairs of conical disks which are infinitely adjustable in relation to one another on shafts by means of adjusting spindles and adjusting levers, and which are joined together by a drive chain.

In variable speed transmissions of this kind, which in cutting machines enable size adjustments to be made, it is especially important to maintain the preset transmission ratio during the entire time that the cut-off machine is in operation. Undesired transmission ratios, resulting for example from such undesired external influences as torque variations, result in variations in rotational speed, which in turn cause differences in the rate of transport of the material, so that the pieces cut are oversize or undersize.

Infinitely variable speed transmissions of the prior art tend to undergo fluctuations in rotational speed upon the occurrence of torque variations, because important parts of the transmission, such as adjusting levers and conical disks, deform resiliently under load fluctuations and thus cause geometrical variations which have a direct effect on the transmission ratio.

Furthermore, it has been found that even with toothed conical disks, there is a slippage between the conical disks and the drive chain. The result is that the desired driven speed of the variable transmission, which has been pre-set accordingly, falls below the intended pre-set value. The drive chain, which consists of articulately joined laminar packets in which the laminae are transversely displaceable, transmits the torque input of the variable speed transmission in a positive manner by the form-fitting engagement of the individual laminae with each tooth flank with which the laminar packet is engaged. The tooth flanks of the individual teeth on the conical disks are at a certain minimum possible angle to one another to assure trouble-free entry and exit of the chain. This low-angle arrangement of the tooth flanks, however, increases the danger of undesired slippage of the laminae which are barely in engagement. Since the laminar packets are positively engaged with the teeth of the conical disks, although the individual laminae engage the flanks of these teeth only frictionally an undesired slippage of the drive chain occurs when the load on the laminae becomes sufficiently great due to torque peaks. This slippage causes a rotary speed fluctuation which in turn causes a size error in the cutting machine.

Since chain slippage cannot entirely be prevented owing to the characteristics of the transmission, it is an object of the present invention to compensate for the variation in the transmission ratio resulting from the state of operation of the cutting machine.

It is a further object of the invention to compensate for such transmission ratio variations by varying the effective diameter of the conical disks making up the transmission.

These and other objects and advantages are realized in accordance with the present invention pursuant to which a counter-force is applied to compensate for variations in the transmission ratio caused by variations in the load of the cutting machine, i.e., variations in the torque of the driven transmission shaft. The counter-force serves to vary the effective spacing between the disks and thus restore the desired transmission ratio.

The required counter-force is controlled automatically according to the state of operation of the cutting machine. This counter-force acts against one or more movable members of the transmission and acts in or transversely to the direction of movement of the transmission members involved. For the production of the counter-force a working cylinder is provided in each case, which either engages an adjusting lever between adjusting spindles and the transmission shaft, or acts upon the drive chain contacting the face of the chain either upstream of the driving shaft where the chain is taut or downstream thereof where the chain is slack.

The advantages achieved by the invention consist particularly in the fact that prior-art variable speed transmissions can be made independent of load by simple means, thereby reducing to a minimum the variations in cut sizes. The transmission thus adapts itself, by means of the variable counter-force, to any load on the cutting machine, i.e., owing to the variability of the counter-force, the stiffness that is required in the variable speed transmission can be adjusted as desired.

A further advantage is the possibility of compensating for fluctuations in the transmission ratio without any interruption of operation by varying the effective diameter at the conical disks, for the purpose of keeping cut size variations within a reasonable range of tolerance.

The invention will now be described with reference to the embodiments represented in the drawings, wherein FIG. 1 is a perspective view of a variable speed transmission with an adjusting spindle, FIG. 2 is a schematic view of an expanded variable speed transmission having two adjusting spindles which are joined together by a chain, FIG. 3 shows the pneumatic circuit for the control of the counter-force, FIG. 4 shows the electrical control of the pneumatic valves, FIG. 5 is a perspective view of the variable speed transmission with a drive chain which is acted upon in its slack portion, FIG. 6 is a schematic representation of the counter-force system represented in FIG. 5, and FIG. 7 is a schematic representation of a drive chain acted upon its taut portion.

Referring now more particularly to the drawings, the variable speed transmission in FIG. 1 comprises a drive transmission shaft 1 and a driven shaft 2 on which there are mounted two pairs of conical disks, 3,4 and 5,6 which are joined together by a suitable drive chain 7; the spacing between disks of each pair may be varied so as to vary the effective diameter of the pair of disks. The establishment of a particular transmission ratio is performed by displacing the conical disk pairs 3–4 and 5–6 by means of the adjusting spindle 8 and adjusting levers 9—9' and 10—10'. To enable the conical disk pairs 3–4 and 5–6 on drive shaft 1 and driven shaft 2 to follow a reciprocal adjustment, the adjusting levers 9, 9' and 10, 10' pivot about their respective fulcrum shafts 11 and 12 which are disposed in the area between the driving and driven shafts. An operating cylinder 13, by which a counter-force is applied to essential parts of the transmission, is articulated to the free end of the adjusting lever 9—9' opposite the end engaged by the adjusting spindle 8.

The production of a counter-force is dependent on the state of the operation of the machine driven by shaft 2, e.g., a cutting machine. During each phase, i.e., acceleration, steady state operation and slowing down an appropriate, predetermined counter-force is produced to stiffen the variable-speed transmission. The magnitude and the direction of the action of this counterforce is determined by a torque switch 14 (FIG. 4). This torque switch 14 responds to variations in the rotational speed of the cutting machine by closing the circuit between buses 15 and 16 through contact 17 and actuating a relay 18, in the case of overspeeding. This operates a solenoid valve 19 and the pressure established in pressure reducing valve 20 is released to the operating cylinder 13. The variable-speed transmission has thus been stiffened by a predetermined counter-force.

When the working speed of the cutting machine achieves steady state, two rest contacts 21 and 22 of the torque switch 14 remain closed, that is, relay 23 is actuated and operates a solenoid valve 24. At the same time relay 18 is inactivated, thereby switching solenoid valve 19 back to its starting position. The pressure required in operating cylinder 13 up to this point for the overspeed phase is now replaced by a lower pressure which is determined by pressure reducing valve 25 and is released by the solenoid valve 24.

When underspeeding occurs in the cutting machine, the torque switch 14 interrupts the circuit between the buses 15 and 16 at the rest contact 22 and closes it again at contact 26. This cuts off the current from relay 23, so that solenoid valve 24 opens to the atmosphere, thus relieving the pressure in pneumatic cylinder 13. At the same time, the relay 27 is energized through contact 26 in the torque switch 14. This applies the pressure established in pressure reducing valve 28 to the opposite side of piston 30 (FIG. 3) in cylinder 13. The line required for this pressure is opened by the solenoid valve 29 operated by relay 27. The pressure applied to the opposite side of the piston places an opposite or negative load on the transmission linkage 9.

When the cutting machine is shut down, the entire counter-force system (FIGS. 3 and 4) is shut off and relieved of pressure. The same state must also exist whenever the variable speed transmission is adjusted to a different transmission ratio. Since a variable speed transmission of this kind cannot, of course, be shifted when it is not running, the same state of inactivity must be maintained also for an established minimum speed of the cut-off machine, while at any other rotary speed or load change in the cutting machine, a corresponding loading of the variable-speed tranmission is introduced.

FIG. 2 shows a schematic representation of another embodiment of a variable-speed transmission. Stiffening of the adjusting levers 9 and 10 is effected in known manner by dual adjusting spindles 31 and 32, which are joined by a chain 33 and by four operating cylinders 13a—13, which simultaneously act on the adjusting levers 9 and 10.

In another embodiment, the drive chain 7 is acted upon, as shown in FIGS. 5 and 6, by an operating cylinder 34 and sliding shoe 35 along the slack run of the chain upstream of and running toward conical disk pairs 5–6. A variant embodiment is shown in FIG. 7, in which the drive chain 7 is acted upon in the taut run of the chain before the chain runs onto the driving conical disk pair 3–4, the force being applied by operating cylinder 34' to the sliding shoe 35' through the medium of lever 36. In both examples, the rotary speed ratio effected by the chain slippage is restored to the desired transmission ratio by a change in the corresponding effective diameter of cone disk pair 3–4 and/or 5–6.

The pneumatic circuit shown in FIG. 3 and the electrical circuit shown in FIG. 4, control operation of cylinders 34 and 34' in the same manner described with reference to piston 30.

It will be appreciated that the instant specification and examples are set forth by way of illustration and not limitation, and that various modifications and changes may be made without departing from the spirit and scope of the present invention.

What is claimed is:

1. In an infinitely variable speed transmission comprising a pair of transmission shafts one of which drives and the other of which is driven, two pairs of conical disks respectively carried on said pair of shafts, a transmission chain operatively connecting said pairs of disks, and means for adjusting the spacing between the disks of each pair and thereby infinitely varying the transmission ratio, the improvement which comprises a counter-force applicator operatively associated with said adjusting means or said transmission chain, and means for actuating said applicator, said actuating means being controlled by the load on the driven transmission shaft, said means for adjusting the spacing between the disks of each pair comprising at least one lever pivotable in a plane parallel to that defined by the transmission shafts and operatively connected to one disk, and means for pivoting said lever so as to displace said one disk and adjust its spacing relative to its companion disk, said counter-force applicator acting against said lever.

2. A transmission according to claim 1, wherein said counter-force applicator comprises a piston and cylinder.

3. A transmission according to claim 1, wherein said counter-force applicator acts against the face of said transmission chain.

4. A transmission according to claim 3, wherein said counter-force applicator acts against said chain at a location upstream of the driving transmission shaft.

5. A transmission according to claim 3, wherein said counter-force applicator acts against said chain at a location upstream of the driven transmission shaft.

6. A transmission according to claim 1, said actuating means including means for sensing the torque on said driven transmission shaft, and means for applying a positive counter-force, no counter-force or a negative counter-force through said applicator in dependence upon the torque.

7. A transmission according to claim 6, wherein said means for adjusting the spacing between the disks of each pair comprises at least one lever pivotable in a plane parallel to that defined by the transmission shafts and operatively connected to one disk, and means for pivoting said lever so as to displace said one disk and adjust its spacing relative to its companion disk, said counter-force applicator acting against said lever and comprising at least one piston and cylinder.

* * * * *